(12) United States Patent
Kitao

(10) Patent No.: US 11,508,971 B2
(45) Date of Patent: Nov. 22, 2022

(54) CATALYST LAYER FOR FUEL CELL

(71) Applicant: TOYOTA JIDOSHA KABUSHIKI KAISHA, Toyota (JP)

(72) Inventor: Noriyuki Kitao, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 181 days.

(21) Appl. No.: 17/072,306

(22) Filed: Oct. 16, 2020

(65) Prior Publication Data

US 2021/0167401 A1 Jun. 3, 2021

(30) Foreign Application Priority Data

Dec. 2, 2019 (JP) .............................. JP2019-218089

(51) Int. Cl.
*H01M 4/92* (2006.01)
*H01M 4/86* (2006.01)

(52) U.S. Cl.
CPC ......... *H01M 4/926* (2013.01); *H01M 4/8657* (2013.01)

(58) Field of Classification Search
None
See application file for complete search history.

(56) References Cited

U.S. PATENT DOCUMENTS 6,936,370 B1 * 8/2005 Knights ............... H01M 4/926
429/492

FOREIGN PATENT DOCUMENTS

| JP | 2003-508877 A | 3/2003 |
| JP | 2014-510993 A | 5/2014 |
| WO | WO 01/15247 A2 | 3/2001 |
| WO | WO 2012/107738 A1 | 8/2012 |

* cited by examiner

*Primary Examiner* — Sarah A. Slifka
(74) *Attorney, Agent, or Firm* — Finnegan, Henderson, Farabow, Garrett & Dunner, LLP

(57) ABSTRACT

There is provided a catalyst layer for a fuel cell that can inhibit reduction in water electrolysis function. The catalyst layer for a fuel cell according to this disclosure comprises carbon supports on which Pt particles are supported, and Ir oxide particles, wherein the ratio of the mean primary particle size of the Ir oxide particles with respect to the mean primary particle size of the Pt particles is 20 or greater. The mean primary particle size of the Pt particles may be 20.0 nm or smaller and the mean primary particle size of the Ir oxide particles may be 100.0 nm to 500.0 nm.

6 Claims, 2 Drawing Sheets

CATALYST LAYER FOR FUEL CELL

FIELD

The present disclosure relates to a catalyst layer for a fuel cell.

BACKGROUND

Fuel cells are known that generate electricity by chemical reaction between an anode gas such as hydrogen and a cathode gas such as oxygen.

One construction known for such a fuel cell is a stack in the following order: anode side separator, anode side gas diffusion layer, anode side catalyst layer, electrolyte layer, cathode side catalyst layer, cathode side gas diffusion layer, cathode side separator.

Catalysts comprising anode side catalyst layers include hydrogen oxidation catalysts and water electrolysis catalysts.

PTLs 1 and 2 both disclose a catalyst layer for a fuel cell using iridium oxide as a hydrogen oxidation catalyst.

CITATION LIST

Patent Literature

[PTL 1] Japanese Patent Public Inspection No. 2003-508877
[PTL 2] Japanese Patent Public Inspection No. 2014-510993

SUMMARY

Technical Problem

The present inventors have found that with a fuel cell having a fuel cell catalyst layer that comprises Pt particles as a hydrogen oxidation catalyst and Ir oxide particles as a water electrolysis catalyst, it is often the case that the Ir oxide particles elute when exposed to a state of high anode potential, resulting in reduced water electrolysis function of the fuel cell catalyst layer.

It is an object of this disclosure to provide a catalyst layer for a fuel cell that can inhibit reduction in water electrolysis function.

Solution to Problem

The present inventors have found that this object can be achieved by the following means.

<Aspect 1>
A catalyst layer for a fuel cell, comprising carbon supports on which Pt particles are supported, and Ir oxide particles, wherein
the ratio of the mean primary crystallite diameter of the Ir oxide particles with respect to the mean primary crystallite diameter of the Pt particles is 20.0 or greater.

<Aspect 2>
The catalyst layer for a fuel cell according to aspect 1, wherein:
the mean primary crystallite diameter of the Pt particles is 10.0 nm or smaller, and
the mean primary crystallite diameter of the Ir oxide particles is 100.0 nm to 500.0 nm.

<Aspect 3>
The catalyst layer for a fuel cell according to aspect 1 or 2, wherein the ratio of the mass of the Pt particles with respect to the carbon supports is 0.18 to 0.35.

<Aspect 4>
The catalyst layer for a fuel cell according to any one of aspects 1 to 3, wherein the mean primary particle size of the carbon supports is 50.0 nm to 300.0 nm.

<Aspect 5>
The catalyst layer for a fuel cell according to any one of aspects 1 to 4, wherein the area-to-weight ratio of the carbon supports is 100 $m^2/g$ or lower.

<Aspect 6>
The catalyst layer for a fuel cell according to any one of aspects 1 to 5, which further comprises an ionomer and wherein:
the ratio of the mass of the ionomer with respect to the mass of the carbon supports is 1.2 to 1.6.

Advantageous Effects of Invention

According to the disclosure it is possible to provide a catalyst layer for a fuel cell that can inhibit reduction in water electrolysis function.

DESCRIPTION OF EMBODIMENTS

Figure 1:
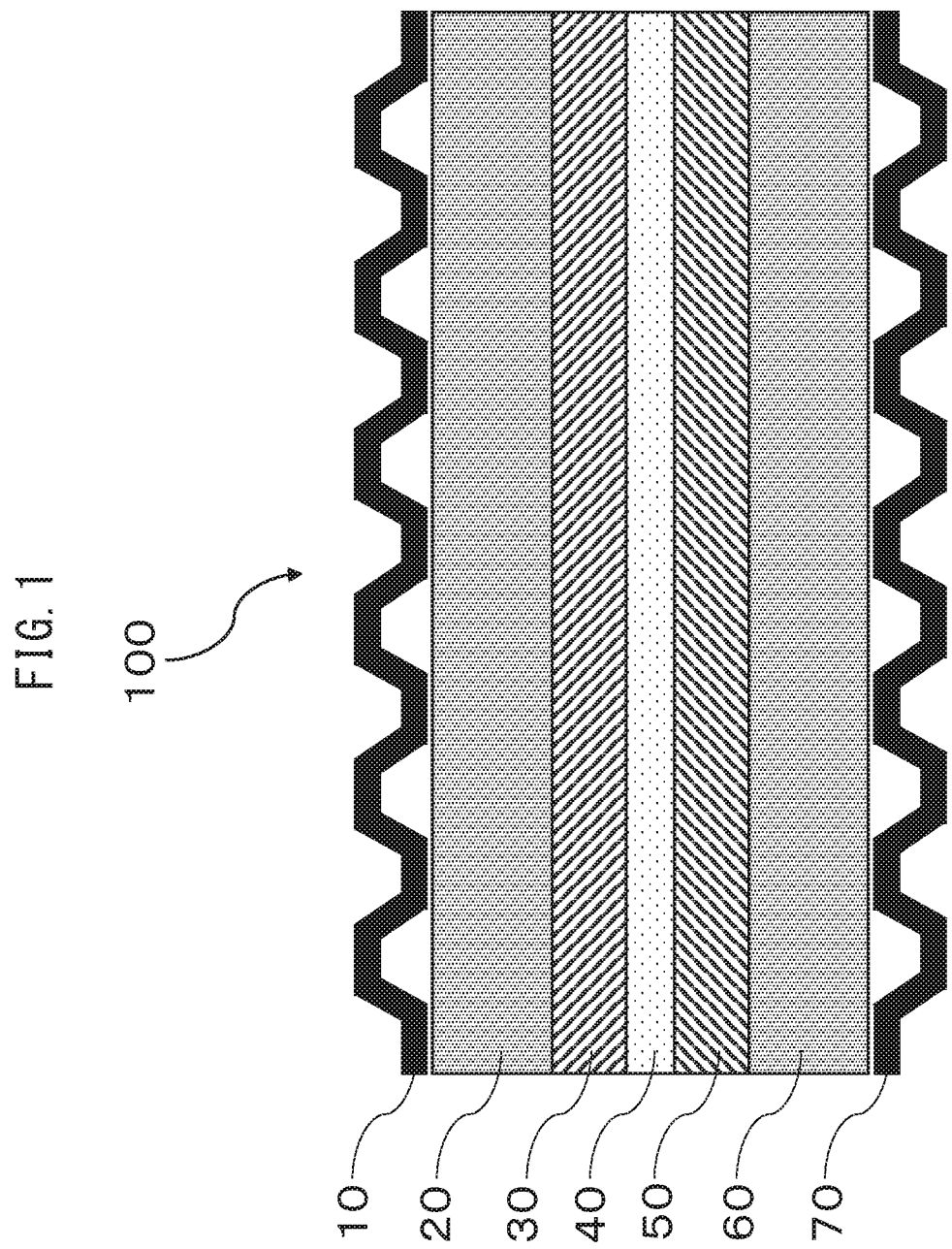
FIG. 1 is a schematic diagram of a fuel cell unit cell 100 having an anode side catalyst layer 30, as a catalyst layer for a fuel cell according to the disclosure.

Embodiments of the disclosure will now be explained in detail. The disclosure is not limited to the embodiments described below, however, and various modifications may be implemented such as do not depart from the gist thereof.

<Catalyst Layer for Fuel Cell>

The catalyst layer for a fuel cell according to the disclosure comprises carbon supports on which Pt particles are supported, and Ir oxide particles, wherein the ratio of the mean primary crystallite diameter of the Ir oxide particles with respect to the mean primary crystallite diameter of the Pt particles is 20 or greater.

Without being limited to any particular principle, the principle by which reduction in water electrolysis function can be inhibited by the catalyst layer for a fuel cell according to the disclosure is presumed to be as follows.

The present inventors have found that in a fuel cell having a conventional fuel cell catalyst layer that comprises a hydrogen oxidation catalyst and Ir oxide as a water electrolysis catalyst, the reduced water electrolysis function that occurs upon exposure to a state of high anode potential is attributable to elution of the Ir oxide in the catalyst layer for a fuel cell under those conditions. The reason for elution of Ir oxide in the catalyst layer for a fuel cell under such conditions is thought to be that the hydrogen oxidation catalyst and water electrolysis catalyst are supported on the same support, which causes the sizes of the Ir oxide particles and Pt particles to be approximately the same, the mean primary crystallite diameter of the Ir oxide particles being, specifically, about several tens of nanometers. If the Ir oxide particles are small, the area-to-weight ratio of the Ir oxide particles increases, presumably aiding their elution.

Since the Ir oxide particles are larger than the Pt particles in the catalyst layer for a fuel cell of the present disclosure, their area-to-weight ratio is relatively smaller than that of the Pt particles. Therefore, the Ir oxide particles are more resistant to elution when the catalyst layer for a fuel cell is being exposed to negative voltage.

This allows the catalyst layer for a fuel cell of the disclosure to have less reduction in water electrolysis function even when exposed to a state of high anode potential.

<Pt Particles>

The catalyst layer for a fuel cell of the disclosure comprises Pt particles as the catalyst metal for acceleration of the hydrogen oxidation reaction. The Pt particles are supported on carbon supports.

The Pt particles may include one or more selected from the group consisting of Pt and Pt alloys. Pt alloys include alloys of Pt with metal materials selected from the group consisting of Sn, Mo, Co, Lu, Rh, Ni and Au, where the metals other than Pt composing the Pt alloy may be of one or more types. In order to obtain satisfactory catalytic activity and durability, the Pt alloy may have a Pt content ratio of 90 wt % or greater, where the total weight of the alloy is 100 wt %.

The mean primary crystallite diameter of the Pt particles may be 10.0 nm or smaller. The mean primary crystallite diameter of the Pt particles may be 3.0 nm or greater or 3.5 nm or greater, and 10.0 nm or smaller or 5.0 nm or smaller.

The mean primary crystallite diameter of the Pt particles is the value measured by a common method in the technical field. The primary crystallite diameter can be determined by X-ray diffraction according to JIS H 7805:2005.

The ratio of the mass of the Pt particles with respect to the carbon supports may be 0.18 to 0.35.

The ratio of the mass of the Pt particles with respect to the carbon supports may be 0.18 or greater, 0.20 or greater, 0.25 or greater or 0.30 or greater, and 0.35 or lower, 0.30 or lower, 0.25 or lower or 0.20 or lower.

<Carbon Support>

The catalyst layer for a fuel cell of the disclosure comprises carbon supports on which the Pt particles are supported.

The carbon supports have pores, and it may be carbon particles, for example, such as Ketchen black (trade name of Ketjen Black International Co.), VULCAN (trade name of Cabot Co.), NORIT (trade name of Norit Co.), Black Pearl (trade name of Cabot Co.) or Acetylene Black (trade name of Chevron Co.), or carbon fibers such as carbon nanotubes, carbon nanohorns, carbon nanowalls or carbon nanofibers, or a conductive carbon material such as a carbon alloy.

The mean primary particle size of the carbon supports may be 50 nm to 300 nm.

The mean primary particle size of the carbon supports may be 50 nm or larger, 80 nm or larger, 100 nm or larger or 150 nm or larger, and 300 nm or smaller, 250 nm or smaller, 200 nm or smaller or 150 nm or smaller.

The mean primary particle size of the carbon supports is the value measured by a common method in the technical field. The primary particle size can be determined, for example, by calculating the diameter of a single particle, considering the particle to be circular (the area equivalent circle diameter) in a transmission electron microscope (TEM) image or scanning electron microscope (SEM) image at a suitable magnification (such as 50,000× to 1,000,000×), and performing such calculation by TEM observation or SEM observation for 200 to 300 particles of the same type, and recording the number average for the particles as the mean particle size.

The area-to-weight ratio of the carbon supports may be 100 $m^2$/g or lower.

The area-to-weight ratio of the carbon supports may be 100 $m^2$/g or lower, 90 $m^2$/g or lower, 80 $m^2$/g or lower or 70 $m^2$/g or lower, and 10 $m^2$/g or higher, 20 $m^2$/g or higher, 30 $m^2$/g or higher or 40 $m^2$/g or higher.

The area-to-weight ratio of the carbon supports can be measured by the BET method.

<Ir Oxide Particles>

The catalyst layer for a fuel cell of the disclosure comprises Ir oxide ($IrO_2$) particles as a water electrolysis catalyst to promote electrolysis reaction of water.

The mean primary crystallite diameter of the Ir oxide particles may be 100 nm to 500 nm.

When the mean primary crystallite diameter of the Ir oxide particles is within this range, elution of the Ir oxide particles in a negative voltage state is more inhibited than when the mean primary crystallite diameter of the Ir oxide particles is smaller than this range. The layer thickness of the catalyst layer for a fuel cell can also be reduced, compared to when the mean primary crystallite diameter of the Ir oxide particles is larger than this range.

The mean primary crystallite diameter of the Ir oxide particles may be 100 nm or larger, 140 nm or larger, 200 nm or larger or 300 nm or larger, and 500 nm or smaller, 480 nm or smaller, 400 nm or smaller or 350 nm or smaller.

The mean primary crystallite diameter of the Ir oxide particles can be measured in the same manner as the method described above for measurement of the mean primary crystallite diameter of the Pt particles.

The ratio of the mean primary crystallite diameter of the Ir oxide particles with respect to the mean primary crystallite diameter of the Pt particles is 20.0 or greater.

The ratio of the mean primary crystallite diameter of the Ir oxide particles with respect to the mean primary crystallite diameter of the Pt particles may be 20.0 or greater, 25.0 or greater, 50.0 or greater or 100.0 or greater, and 500.0 or lower, 250.0 or lower, 100.0 or lower or 50.0 or lower.

<Ionomer>

The catalyst layer for a fuel cell of the disclosure may further comprise an ionomer.

The ionomer may be one with proton conductivity, an example of which is a perfluorosulfonic acid-based resin such as Nafion$^R$.

The content of the ionomer in the catalyst layer may be set as appropriate for the amount of carbon supports, but preferably the ratio of the mass of the ionomer with respect to the mass of the carbon supports is 1.2 to 1.6.

If the ratio of the mass of the ionomer with respect to the mass of the carbon supports is 1.2 or greater, the hydrogen oxidation performance can be increased since high proton conductivity is maintained in the catalyst layer for a fuel cell, while the water electrolysis performance can be increased by higher efficiency of water supply in the catalyst layer for a fuel cell.

If the ratio of the mass of the ionomer with respect to the mass of the carbon supports is 1.6 or lower, it will be possible to efficiently inhibit anode flooding, thereby helping to maintain diffusibility of the fuel gas and consequently improving the hydrogen oxidation performance.

When the ratio of the mass of the ionomer with respect to the mass of the carbon supports is within the aforementioned range, therefore, it is possible to simultaneously improve the hydrogen oxidation performance and water electrolysis performance in the catalyst layer for a fuel cell.

The ratio of the mass of the ionomer with respect to the mass of the carbon supports may be 1.2 or greater, 1.3 or greater, 1.4 or greater or 1.5 or greater, and 1.6 or lower, 1.5 or lower, 1.4 or lower or 1.3 or lower.

<Production Method>

The catalyst layer for a fuel cell of the disclosure can be produced by the following steps A to D, as an example, although the production method is not particularly limited to these steps.

A: Pt particles are supported on carbon supports,

B: the carbon supports on which the Pt particles are supported, the Ir oxide particles, and an ionomer are mixed to obtain a mixture wherein the ratio of the mean primary crystallite diameter of the Ir oxide particles with respect to the mean primary crystallite diameter of the Pt particles is 20 or greater, and C: a catalyst layer for a fuel cell is formed from the mixture.

(Step A)

Step A is a step of supporting Pt particles on carbon supports. A method commonly employed in the prior art may be used for this step. An example of such a method is a method of mixing a catalyst metal ion or complex with a support dispersion obtained by dispersion of carbon supports, filtering and washing the mixture, re-dispersing it in ethanol, for example, and drying it with a vacuum pump, for example.

(Step B)

Step B is a step of mixing the carbon supports on which the Pt particles are supported, the Ir oxide particles and an ionomer, to obtain a mixture. In this step, the carbon supports on which the Pt particles are supported, the Ir oxide particles and the ionomer are dispersed and mixed in a dispersing medium, either simultaneously or in any desired order, to obtain a mixture.

Step B may be carried out by dispersing the carbon supports on which the Pt particles are supported, the Ir oxide particles and the ionomer in the dispersing medium. The dispersing medium is not particularly restricted and may be appropriately selected depending on the ionomer used, for example. Examples of such dispersing media include alcohols such as methanol, ethanol, propanol and propylene glycol, N,N-dimethylformamide, N,N-diethylformamide, N,N-dimethylacetamide, N,N-diethylacetamide, mixtures of the foregoing, and mixtures of the same with water.

(Step C)

Step C is a step of forming a catalyst layer for a fuel cell from the mixture. The method of forming the catalyst layer for a fuel cell is not particularly restricted, and an example is a method in which a dispersing medium is added as necessary to the mixture of the carbon supports on which the Pt particles are supported, the Ir oxide particles and the ionomer, and the mixture is coated and dried onto the surface of a base material such as carbon paper, or a solid electrolyte film. The thickness of the catalyst layer for a fuel cell is not particularly restricted, and it may be 20 μm or smaller or 10 μm or smaller, and 3 μm or greater.

<Fuel Cell>

The fuel cell with the catalyst layer for a fuel cell of the disclosure may have the following construction, as an example.

A fuel cell comprising the following stacked in order: anode side separator, anode side gas diffusion layer, anode side catalyst layer, electrolyte layer, cathode side catalyst layer, cathode side gas diffusion layer, cathode side separator.

In this type of fuel cell, the catalyst layer for a fuel cell according to the disclosure may be used as the anode side catalyst layer. The materials and construction other than the catalyst layer for a fuel cell of the disclosure for this type of fuel cell may be any materials and construction that can be used for a fuel cell.

FIG. 1 is a schematic diagram of a fuel cell unit cell 100 having an anode side catalyst layer 30, as a catalyst layer for a fuel cell according to the disclosure.

As shown in FIG. 1, the fuel cell unit cell 100 having an anode side catalyst layer 30 as the catalyst layer for a fuel cell of the disclosure comprises an anode side separator 10, an anode side gas diffusion layer 20, anode side catalyst layer 30, an electrolyte layer 40, a cathode side catalyst layer 50, a cathode side gas diffusion layer 60 and a cathode side separator 70, stacked in that order.

While not shown in FIG. 1, the rest of the construction of the fuel cell unit cell 100 with the catalyst layer for a fuel cell of the disclosure is the same as a common fuel cell.

FIG. 1 is not intended to limit the aspects of the catalyst layer for a fuel cell of the disclosure.

EXAMPLES

Examples 1 and 2 and Comparative Examples 1 and 2

Catalyst layers for anodes were prepared for Examples 1 and 2 and Comparative Examples 1 and 2 as described below, and the performance of fuel cells assembled using the catalyst layers for fuel cells of each of the Examples was evaluated.

Example 1

(Preparation of Catalyst Ink for Anode Side Catalyst Layer)

Carbon support particles with a mean primary particle size of 150 nm and an area-to-weight ratio of 80 m$^2$/g were immersed in a Pt complex solution (pH 1) for chemical reduction, to load the Pt particles as a catalyst metal onto the carbon supports.

The mean primary crystallite diameter of the Pt particles was 3.3 nm. The loading mass of the Pt particles on the carbon supports was 30 mass % with respect to the total of the Pt particles and the carbon supports.

Next, the carbon supports on which the Pt particles were supported, IrO$_2$ particles with a mean primary crystallite diameter of 140.0 nm, a perfluorosulfonic acid-based resin as an ionomer and zirconia beads (diameter: 1 mm) were loaded into a planetary ball mill vessel and the vessel was completely sealed. During the loading, the amounts of the catalyst metal-loaded support and the ionomer were adjusted so that the ratio of the ionomer (I) and carbon supports (C) (I/C) was 1.4 (mass ratio).

The vessel was mounted onto the body of the planetary ball mill and 6 hours of treatment were carried out at a platform rotation speed of 300 rpm, covering the Pt particle-loaded carbon supports and the IrO$_2$ particles with the ionomer to obtain a catalyst for the anode side catalyst layer. The obtained fuel cell catalyst was stirred and mixed with ethanol and water to prepare a catalyst ink for the anode side catalyst layer.

(Preparation of Catalyst Ink for Cathode Side Catalyst Layer).

A catalyst ink for the cathode side catalyst layer was prepared in the same manner as preparation of the catalyst ink for the anode side catalyst layer, except that IrO$_2$ particles were not added.

(Fabrication of Fuel Cell)

The catalyst ink for the anode side catalyst layer was coated onto one side of a perfluorocarbonsulfonic acid resin film (thickness: 10 μm) serving as the electrolyte layer, while the catalyst ink for the cathode side catalyst layer was coated onto the other side, both by spray coating, to form an anode side catalyst layer and a cathode side catalyst layer, thereby obtaining an electrolyte membrane catalyst layer assembly. The thickness of the catalyst layers were 6 μm.

The basis weight of the Pt particles in the anode side catalyst layer was 0.045 mg/cm$^2$, and the basis weight of the $IrO_2$ particles was 0.02 mg/cm$^2$. The Pt particles supported on the carbon supports had an ElectroChemical Surface Area (ECSA), which is the active specific surface area effective for electrochemical reaction, of 27 m$^2$/g, as measured by the BET method.

The obtained electrolyte membrane catalyst layer assembly was then clamped with gas diffusion layer carbon paper and subjected to thermocompression bonding to obtain a membrane electrode assembly (MEA). The membrane electrode assembly was clamped with two separators (made of carbon) to fabricate a fuel cell having the anode side catalyst layer of Example 1.

Example 2 and Comparative Examples 1 and 2

A fuel cell having the anode side catalyst layer of each Example was fabricated in the same manner as Example 1, except for changing the mean primary crystallite diameter of the $IrO_2$ particles. The mean primary crystallite diameter of the $IrO_2$ particles was 480.0 nm in Example 2, 4.1 nm in Comparative Example 1 and 58.0 nm in Comparative Example 2.

<Evaluation of Battery Performance>
(Evaluation Method)

Using fuel cells having anode side catalyst layers from each Example, N$_2$ gas (H$_2$-free) with a relative humidity of 100% was distributed on the anode side while air with a relative humidity of 100% was distributed on the cathode side, and water electrolysis reaction was carried out on the anode side by current sweeping under conditions with a current density of 0.2 A/cm$^2$ and a 5-hour sweep. The voltage of the fuel cell was then measured. After the test, the active area-to-weight ratio of the Pt particles and the mean primary crystallite diameter of the $IrO_2$ particles were measured.

(Results)

The results are shown in Table 1 below.

As shown in Table 1, in Example 1 wherein the mean primary crystallite diameter of the $IrO_2$ particles was 140.0 nm (the ratio of the mean primary crystallite diameter of the $IrO_2$ particles with respect to the mean primary crystallite diameter was 42.4), and Example 2 wherein the mean primary crystallite diameter of the $IrO_2$ particles was 480.0 nm (the ratio of the mean primary crystallite diameter of the $IrO_2$ particles with respect to the mean primary crystallite diameter was 145.5), the voltages after the test were 0.71 V and 0.72 V, respectively, being virtually unchanged from the initial value of 0.73 V. The mean primary crystallite diameters of the $IrO_2$ particles after the test were 130 nm and 480 nm, respectively, indicating no significant change in the mean primary crystallite diameter of the $IrO_2$ particles before and after the test.

This indicates that in Example 1 and Example 2, elution of $IrO_2$ particles was inhibited, i.e. that reduction in water electrolysis performance can be inhibited when H$_2$ is deficient on the anode side of the fuel cell.

In Comparative Example 1, however, wherein the mean primary crystallite diameter of the $IrO_2$ particles was 4.1 nm (the ratio of the mean primary crystallite diameter of the $IrO_2$ particles with respect to the mean primary crystallite diameter was 1.2), and Example 2 wherein the mean primary crystallite diameter of the $IrO_2$ particles was 58.0 nm (the ratio of the mean primary crystallite diameter of the $IrO_2$ particles with respect to the mean primary crystallite diameter was 17.6), the voltages after the test were 0.34 V and 0.48 V, respectively, which were significantly reduced from the initial value of 0.73 V.

The mean primary crystallite diameters of the $IrO_2$ particles after the test were ≤1.0 nm and ≤25.0 nm, respectively, which indicated a notable reduction in the mean primary crystallite diameter of the $IrO_2$ particles.

These results indicate that for Comparative Example 1 and Comparative Example 2, the $IrO_2$ particles eluted and the water electrolysis performance was reduced when H$_2$ was deficient on the anode side of the fuel cell, resulting in deterioration of the anode catalyst layer.

Incidentally, since the active area-to-weight ratio (m$^2$/g) of the Pt particles in Examples 1 and 2 and Comparative Examples 1 and 2 were virtually unchanged from the initial value, this suggests that the mean primary crystallite diameter of the Pt particles is also maintained.

Example 1 and Examples 3 to 15

Catalyst layers for anodes were prepared for Example 1 and Examples 3 to 15 as described below, and the perfor-

TABLE 1

| | Original | | | | | After testing | | |
|---|---|---|---|---|---|---|---|---|
| Example | Pt particle mean primary crystallite diameter (nm) | Pt particle active area-to-weight ratio (m$^2$/g) | IrO$_2$ particle mean primary crystallite diameter (nm) | Ratio of IrO$_2$ particle mean primary crystallite diameter to Pt particle mean primary crystallite diameter | Voltage (V) | Pt particle active area-to-weight ratio (m$^2$/g) | IrO$_2$ particle mean primary crystallite diameter (nm) | Voltage (V) |
| Comp. Example 1 | 3.3 | 27 | 4.1 | 1.2 | 0.73 | 26 | ≤1.0 | 0.34 |
| Comp. Example 2 | 3.3 | 27 | 58.0 | 17.6 | 0.73 | 27 | ≤25.0 | 0.48 |
| Example 1 | 3.3 | 27 | 140.0 | 42.4 | 0.73 | 27 | 130.0 | 0.71 |
| Example 2 | 3.3 | 27 | 480.0 | 145.5 | 0.73 | 26 | 470.0 | 0.72 | mance of fuel cells assembled using the catalyst layers for fuel cells of each of the Examples was evaluated.

Examples 3 to 15

Catalyst layers for anodes were prepared in the same manner as Example 1, except that the ratio between the ionomer (I) and the carbon supports (C) (I/C) was as shown in Table 2, and fuel cells having the anode side catalyst layers of each of the Examples were fabricated.
<Evaluation of Battery Performance
(Evaluation Method)
Fuel cells with the anode side catalyst layers of each of the Examples were used to generate electricity with a fuel cell temperature of 70° C., while distributing $H_2$ gas with a relative humidity of 30% on the anode side and air with a relative humidity of 30% on the cathode side, the voltage of each fuel cell was measured under conditions with a current density of 3.0 A/cm$^2$, and the battery performance (hydrogen oxidation performance) was evaluated.

Using a fuel cell having the anode side catalyst layer of each Example, and switching the anode side gas to $N_2$ gas and changing the fuel cell temperature to −10° C., the duration of the oxygen generation reaction was measured and the water electrolysis performance was evaluated.
(Results)
The results are shown in Table 2 and FIG. 2.

TABLE 2

| | Conditions | Results | |
|---|---|---|---|
| Example | I/C | Voltage (mV) | OER duration (sec) |
| Example 3 | 0.6 | 333 | 28 |
| Example 4 | 0.7 | 340 | 30 |
| Example 5 | 0.8 | 366 | 34 |
| Example 6 | 0.9 | 380 | 40 |
| Example 7 | 1.0 | 400 | 45 |
| Example 8 | 1.1 | 405 | 50 |
| Example 9 | 1.2 | 410 | 65 |
| Example 10 | 1.3 | 408 | 70 |
| Example 1 | 1.4 | 406 | 68 |
| Example 11 | 1.5 | 409 | 72 |
| Example 12 | 1.6 | 415 | 72 |
| Example 13 | 1.7 | 378 | 68 |
| Example 14 | 1.8 | 355 | 68 |
| Example 15 | 1.9 | 330 | 70 |

Figure 2:
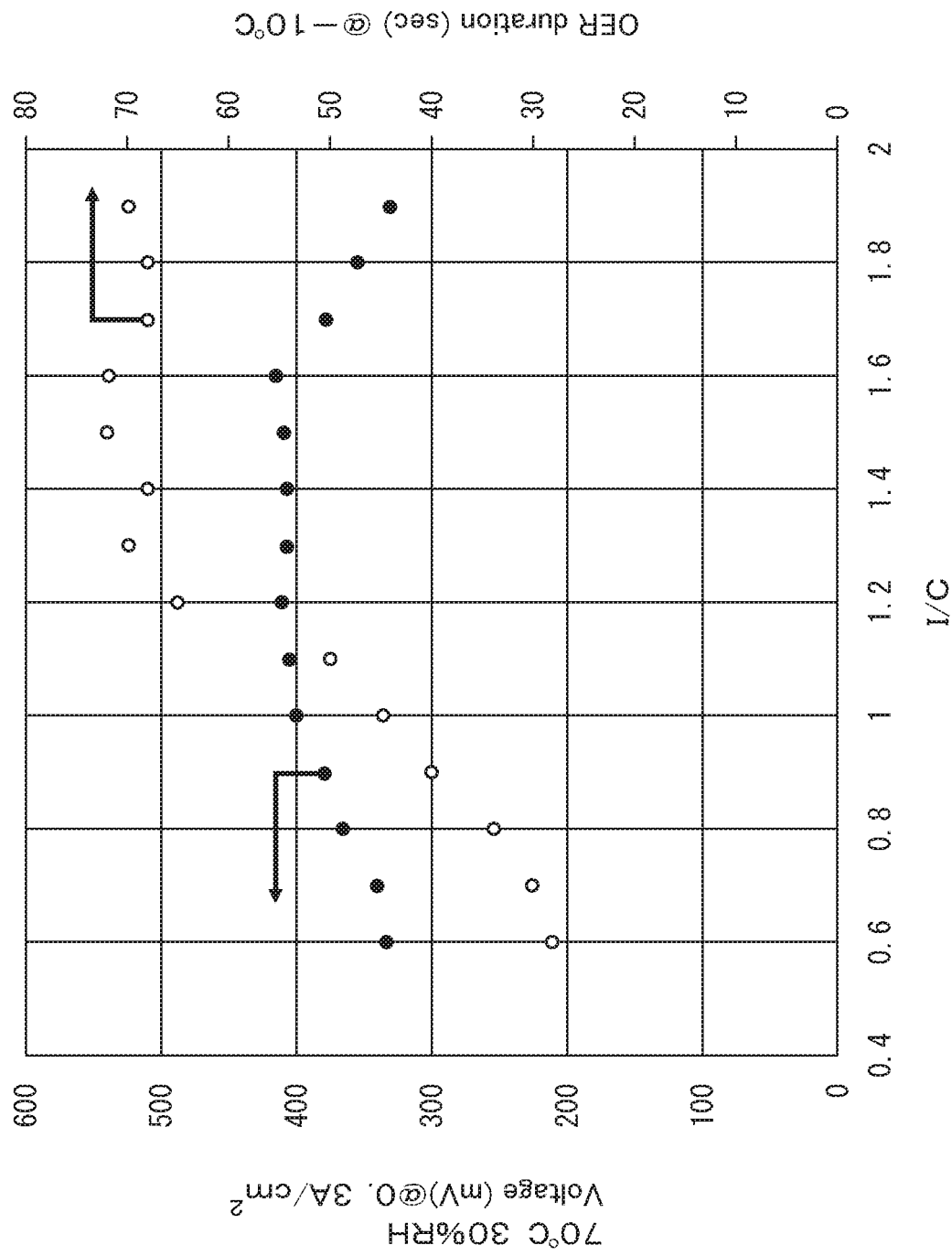
FIG. 2 is a graph showing the relationship between ionomer amount and hydrogen oxidation performance/water electrolysis performance, for the catalyst layers for fuel cells 30 of Examples 3 to 16.

As shown in Table 2 and FIG. 2, with Examples 1 and 7 to 12, wherein the ratio of the ionomer (I) and the carbon supports (C) (I/C) was in the range of 1.0 to 1.6, the voltage was ≥400 mV and high battery performance (hydrogen oxidation performance) was exhibited. In Examples 1 and 9 to 15, wherein the ratio of the ionomer (I) and the carbon supports (C) (I/C) was 1.2 or greater, an OER duration of ≥65 seconds was obtained, and the fuel cells exhibited high water electrolysis performance.

In summary, both high hydrogen oxidation performance and high water electrolysis performance were exhibited with the fuel cells with anode side catalyst layers of Example 1 and Examples 9 to 12, wherein the ratio of the ionomer (I) and carbon supports (C) (I/C) was in the range of 1.2 to 1.6.

REFERENCE SIGNS LIST

10 Anode side separator
20 Anode side gas diffusion layer
30 Anode side catalyst layer
40 Electrolyte layer
50 Cathode side catalyst layer
60 Cathode side gas diffusion layer
70 Cathode side separator
100 Fuel cell unit cell

The invention claimed is:

1. A catalyst layer for a fuel cell, comprising;
Pt particles on carbon supports, and
Ir oxide particles,
wherein the ratio of the mean primary crystallite diameter of the Ir oxide particles with respect to the mean primary crystallite diameter of the Pt particles is 20.0 or greater.

2. The catalyst layer for a fuel cell according to claim 1, wherein:
the mean primary crystallite diameter of the Pt particles is 10.0 nm or smaller, and
the mean primary crystallite diameter of the Ir oxide particles is 100.0 nm to 500.0 nm.

3. The catalyst layer for a fuel cell according to claim 1, wherein the ratio of the mass of the Pt particles with respect to the carbon supports is 0.18 to 0.35.

4. The catalyst layer for a fuel cell according to claim 1, wherein the mean primary particle size of the carbon supports is 50.0 nm to 300.0 nm.

5. The catalyst layer for a fuel cell according to claim 1, wherein the area-to-weight ratio of the carbon supports is 100 m$^2$/g or lower.

6. The catalyst layer for a fuel cell according to claim 1, which further comprises an ionomer, and wherein:
the ratio of the mass of the ionomer with respect to the mass of the carbon supports is 1.2 to 1.6.

* * * * *